US007070692B2

(12) United States Patent
Knight

(10) Patent No.: US 7,070,692 B2
(45) Date of Patent: *Jul. 4, 2006

(54) FUEL FILTER WITH KEYS

(75) Inventor: Steven R. Knight, Portland, CT (US)

(73) Assignee: Parker Intangibles LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/988,347

(22) Filed: Nov. 12, 2004

(65) Prior Publication Data

US 2005/0072721 A1 Apr. 7, 2005

Related U.S. Application Data

(60) Continuation of application No. 10/824,916, filed on Apr. 15, 2004, now abandoned, which is a division of application No. 10/129,350, filed as application No. PCT/US00/31329 on Nov. 15, 2000, now Pat. No. 6,797,168.

(60) Provisional application No. 60/168,941, filed on Dec. 3, 1999.

(51) Int. Cl.
*B01D 27/10* (2006.01)

(52) U.S. Cl. .................. 210/497.01; 210/234; 210/430; 210/493.2

(58) Field of Classification Search ................. 210/232, 210/234, 235, 416.4, 430, 431, 438, 457, 210/458, 493.1, 493.2, 497.01; 137/384.2, 137/384.6
See application file for complete search history.

(56) References Cited

U.S. PATENT DOCUMENTS

| 3,931,011 | A | 1/1976 | Richards et al. |
| RE29,447 | E | 10/1977 | Farrow et al. |
| 4,522,712 | A | 6/1985 | Fischer et al. |
| 4,692,245 | A | 9/1987 | Church et al. |
| 5,045,192 | A | 9/1991 | Terhune |
| 5,154,823 | A | 10/1992 | Ma et al. |
| 5,186,829 | A | 2/1993 | Janik |
| 5,244,571 | A | 9/1993 | Church et al. |
| 5,846,417 | A | 12/1998 | Jiang et al. |
| 5,855,780 | A | 1/1999 | Dye et al. |
| 5,958,230 | A | 9/1999 | Pyle et al. |
| 6,139,738 | A | 10/2000 | Maxwell |
| 6,189,513 | B1 | 2/2001 | Brown et al. |
| 6,495,042 | B1 * | 12/2002 | Knight .................. 210/497.01 |
| 6,797,168 | B1 * | 9/2004 | Knight .................. 210/497.01 |

FOREIGN PATENT DOCUMENTS

| CA | 824484 | 10/1969 |
| WO | WO 95/13468 | 5/1995 |

* cited by examiner

*Primary Examiner*—Matthew O. Savage
(74) *Attorney, Agent, or Firm*—Christopher H. Hunter

(57) ABSTRACT

A filter element removably located in a housing having a central valve structure. The element has an end cap with a valve actuating portion. The valve actuating portion includes a cylindrical portion and an annular base projecting radially inward from the cylindrical portion. The valve actuating portion includes a plurality of thin, flat keys spaced around the annular base and projecting radially inward from the cylindrical portion and axially outward from the base. The keys engage the valve structure in the housing when the element is installed, and open up a flow passage through the housing.

13 Claims, 12 Drawing Sheets

FUEL FILTER WITH KEYS

CROSS REFERENCE TO RELATED APPLICATION

This application is continuation of U.S. patent application Ser. No. 10/824,916, filed Apr. 15, 2004 now abandoned; which is a divisional of U.S. patent application Ser. No. 10/129,350 filed on May 2, 2002, now U.S. Pat. No. 6,797,168; which is a national phase application under 35 U.S.C. § 371 of International Application No. PCT/US00/31329 filed on Nov. 15, 2000 and which designated the United States, and which claims priority to U.S. patent application Ser. No. 60/168,941 filed on Dec. 3, 1999 and U.S. patent application Ser. No. 09/452,857 filed on Dec. 3, 1999, now U.S. Pat. No. 6,495,042, the disclosures of which are incorporated herein by reference.

FIELD OF THE INVENTION

This invention relates to fluid filters, and more particularly to fuel filters for vehicles.

BACKGROUND OF THE INVENTION

Many types of fuel filters (also referred to as "separators") are known in the prior art. A popular type of fuel filter has a housing that encloses a replaceable ring-shaped filter element. The filter element ensures that impurities are removed from fuel before it is delivered to system components such as fuel injection pumps and fuel injectors. Mating portions of the housing form an interior enclosure for the element, and the housing portions may be separated for replacement of a spent filter element. Periodic replacement of the filter element is required so that the filter element will not become so loaded with impurities that fuel flow is restricted. Cost and ease of manufacture have been important considerations with such elements. However, problems may arise when such filter elements are replaced.

One problem is that filter elements with different sizes and/or filtration capabilities often have identical mounting configurations and can fit on the same filter head. However, use of the wrong filter can cause poor engine performance and allow undesirable amounts of contaminants to pass through the fuel system.

Another problem is that individuals may remove a spent filter element and simply re-attach the housing portions without a fresh element. While the engine may operate (at least for a short period of time), this can be detrimental to the engine.

A still further problem is that disturbance of the spent element during replacement may cause collected impurities to fall off the element. In some designs, these impurities may pass into the outlet of the filter housing and reach the components downstream in the fuel system.

To reduce and at least partially eliminate these problems, the filter assembly shown in U.S. Pat. No. 4,836,923, owned by the Assignee of the present application, was developed. This filter includes a unique replaceable filter element that is attached to a removable cover. The housing has an internal standpipe with an opening at the top end. When the element is removed from the housing, the fuel level in the housing falls below the opening in the standpipe. As a result, the impurity-laden fuel left in the housing is less likely to reach the outlet. Likewise, when a new element is installed in the housing, only fuel that has been purified by passing through the media of the element is enabled to reach the opening and pass out of the housing.

While this filter design has many advantages, if the filter element is not removed carefully, impurity-laden fuel in the housing or from the outer surface of the element may fall into the opening in the standpipe. If this happens, some impurities may still reach the downstream components of the fuel system.

In addition, the cover is discarded with each spent element. This is undesirable from a conservation and solid waste standpoint. It is generally desirable to minimize the amount of material discarded, particularly if a discarded element must be treated as hazardous waste. The cover also represents a portion of the cost of the replacement element. As a result this design adds cost to the replacement element. Further, the element may be separated from the cover, and the cover re-attached to the housing without a fresh element also being installed. As such, it still does not fully address the problems associated with operating an engine without a filter element installed.

A further improved filter is shown in U.S. Pat. No. 5,770,065, also owned by the assignee of the present application. In this filter, the filter element is received around a standpipe extending centrally in the housing. A spring-biased valve element internal to the standpipe is normally closed, and can be engaged and moved to an open position by a projection on the element when the element is properly installed in the housing. This filter provides the advantages of the '923 patent, as well as prevents impurity-laden fuel from passing through the standpipe when the element is changed. The assembly also prevents operation of the engine without an appropriate element in place.

The filter shown in the '065 patent has received widespread acceptance in the marketplace. Nevertheless, it is believed that there exists a need for a still further filter which has the advantages of the '065 patent, but where the valve structure is located exterior to the standpipe. Such a valve structure can be easier to manufacture and assemble, thereby reducing the cost of the assembly. It is also believed there is a demand for a filter where the opening into the standpipe is located toward the lower end of the filter. This can prevent or at least reduce the chance of pulling air into the system, as the opening is kept below the level of the fuel.

As such, it is believed that there exists a need for a further improved fuel filter which overcomes at least some of the above-described drawbacks.

According to one aspect of the present invention there is provided a filter subassembly comprising a filter element including a ring of filter media circumscribing a central axis. The ring has a first end and a second end. First and second end caps are fixed to the first and second ends, respectively, of the filter media. The second end cap has an annular end cap portion sealingly bonded to the second end of the filter media and a valve-actuating portion. The valve-actuating portion includes an axially extending cylindrical portion connected to the annular end cap portion and circumscribing the inner diameter of the annular end cap portion. An annular base is connected to the cylindrical portion and extends radially inward from the cylindrical portion to define a first central opening which can receive a pipe. At least one key is provided with the valve actuating portion having an engaging portion radially inward spaced from the cylindrical portion and axially spaced away from said annular base.

SUMMARY OF THE PRESENT INVENTION

A new and unique fuel filter is thereby provided that prevents an improper filter element from being used in the filter and prevents operation of the filter without a filter element in place. The filter is simple and low-cost to manufacture and assemble, and prevents air from entering the system.

According to the present invention, a pipe extends centrally within the housing, and a valve structure is provided externally to the pipe. In one embodiment, the pipe is a standpipe fluidly connected to the outlet port; while in another embodiment the pipe is an inlet pipe to a fuel pump in the housing. In either embodiment, the pipe includes a central fluid passage and opening into the passage toward the lower end of the pipe. A radially-outward facing groove or channel is provided circumferentially around the pipe, near the opening.

The valve structure for the filter includes a valve device and a latch device, with the valve device including a sleeve closely surrounding the pipe. The valve device further includes an annular, radially-outward projecting base surrounding the sleeve. A series of radially-outward projecting tabs are spaced around the periphery of the base. The valve device can be easily manufactured unitarily in one piece from inexpensive material, such as plastic.

The latch device from the valve structure includes a series of deformable fingers in an annular array closely surrounding the pipe. The distal ends of the fingers are normally aligned with and engage the groove in the pipe to prevent the latch device from moving axially along the pipe. The latch device, in the locked position, supports the valve device in a position such that the valve sleeve blocks flow through the opening in the pipe. The latch device further includes an annular sleeve radially outwardly-spaced from the fingers. One end of the sleeve, located away from the valve device, is connected to the fingers, while the other end of the sleeve, located adjacent the valve device, defines an annular engagement surface. The latch device likewise can be easily manufactured in one piece from inexpensive material, such as plastic.

According to the first embodiment, the housing is designed for a "top-loaded" element, and includes a removable lid. In this embodiment, the latch device is located between the valve device and the lower end of the housing, with the annular engagement surface of the latch device facing upwardly in the housing and against the base of the valve device.

In the second embodiment, the housing is designed for a "bottom loaded" element, and the latch device is located between the valve device and the pump, with the annular engagement surface of the latch device facing downwardly in the housing, and against the base of the valve device.

In either embodiment, a compression spring surrounds the pipe and urges the latch device toward the valve device.

The filter element for the fuel filter includes a ring of filter media circumscribing a central axis and having upper and lower end caps. Each end cap has an annular portion bonded to the filter media. The lower end cap has an axially-extending cylindrical portion connected to and bounding the inner diameter of the annular end cap portion, and an annular base projecting radially-inward from the cylindrical portion. The annular base closely surrounds the sleeve of the valve device in the first embodiment, and the inlet pipe in the second embodiment.

A key device is located internally of the cylindrical portion of the lower end cap. The key device includes an annular base dimensioned to fit within the cylindrical portion, and a plurality of thin, flat keys projecting axially away from the annular base. The keys project axially-outward (i.e., downward) from the media ring in the first embodiment (the "top-loaded design"); and axially-inward (i.e., upward) into the media ring in the second embodiment (the "bottom-loaded" design). The keys preferably include a step defining an axially longer and radially thinner portion, and an axially shorter and radially wider portion. The key device, including the base and keys, is also preferably formed unitarily, in one piece, from inexpensive material, such as plastic. In the first embodiment, a first O-ring is provided in an axially-outward facing groove in the base of the key device to seal against the annular base of the lower end cap; while a second O-ring seal is provided in a radially-inward facing groove in the base to seal against the valve sleeve.

The key device is located between the lower end cap of the filter element and the valve device when the filter element is installed within the housing. In the first embodiment, when the filter element is inserted from the upper end of the housing, the keys of the key device are received downwardly between the tabs on the valve device. The longer portions of the keys engage the upward-facing engagement surface on the latch device and cause the latch device to bend, which in turn causes the fingers to move radially outward from their locking engagement with the groove in the standpipe. At the same time, the shorter portions of the keys engage the base of the valve device and cause the valve device to move downwardly along the standpipe, against the latch device, and out of blocking relation with the opening in the standpipe. When the element is properly positioned in the housing, the opening to the standpipe is completely open to allow fuel flow through the fuel filter.

In the second embodiment, when the element is bottom-loaded, the keys of the key device are similarly received between the tabs on the valve device, with the longer portions of the keys engaging the downward-facing engagement surface on the latch device. This similarly causes the latch device to bend, and the fingers to move radially outward from their locking engagement with the groove in the pipe. The shorter portions of the keys at the same time engage the lower surface of the base of the valve device and cause the valve device to move upwardly along the pipe (against the latch device), uncovering the flow opening in the pipe. When the element is properly positioned in the housing, the opening to the inlet pipe is completely open to allow flow through the filter assembly.

The dimensions, number and location of the keys on the key device and the tabs on the valve device can be selected to allow only a specific filter element to be used with a particular housing. An incorrect geometry number or arrangement of keys and/or tabs will prevent a filter element from being properly located in the housing. The keys and tabs are relatively easy to fabricate, using simple molding operations.

Once a filter element with a proper selection of keys is installed in the housing, fluid can be provided into the housing and pass through the filter media ring to be filtered. When the element is to be replaced, the spring assists in removing the element from the housing, and returns the valve device to a position blocking the opening in the pipe. This prevents unfiltered fuel and contaminants from passing through the pipe and downstream in the system. The location of the opening in the lower end of the pipe is below the typical level of fuel in the housing, which prevents air from passing downstream through the system.

The key device, valve device and latch device are easily assembled over the standpipe and inlet pipe during assembly of the filter housing.

Thus, as described above, the filter of the present invention provides many of the benefits of the prior art filters such as preventing an improper element from being installed within the housing, and preventing operation of the filter without and element in place. In addition, the filter is simple and low cost to manufacture and assemble, and prevents air from entering the system.

DETAILED DESCRIPTION OF THE PREFERRED EMBODIMENT

Figure 1:
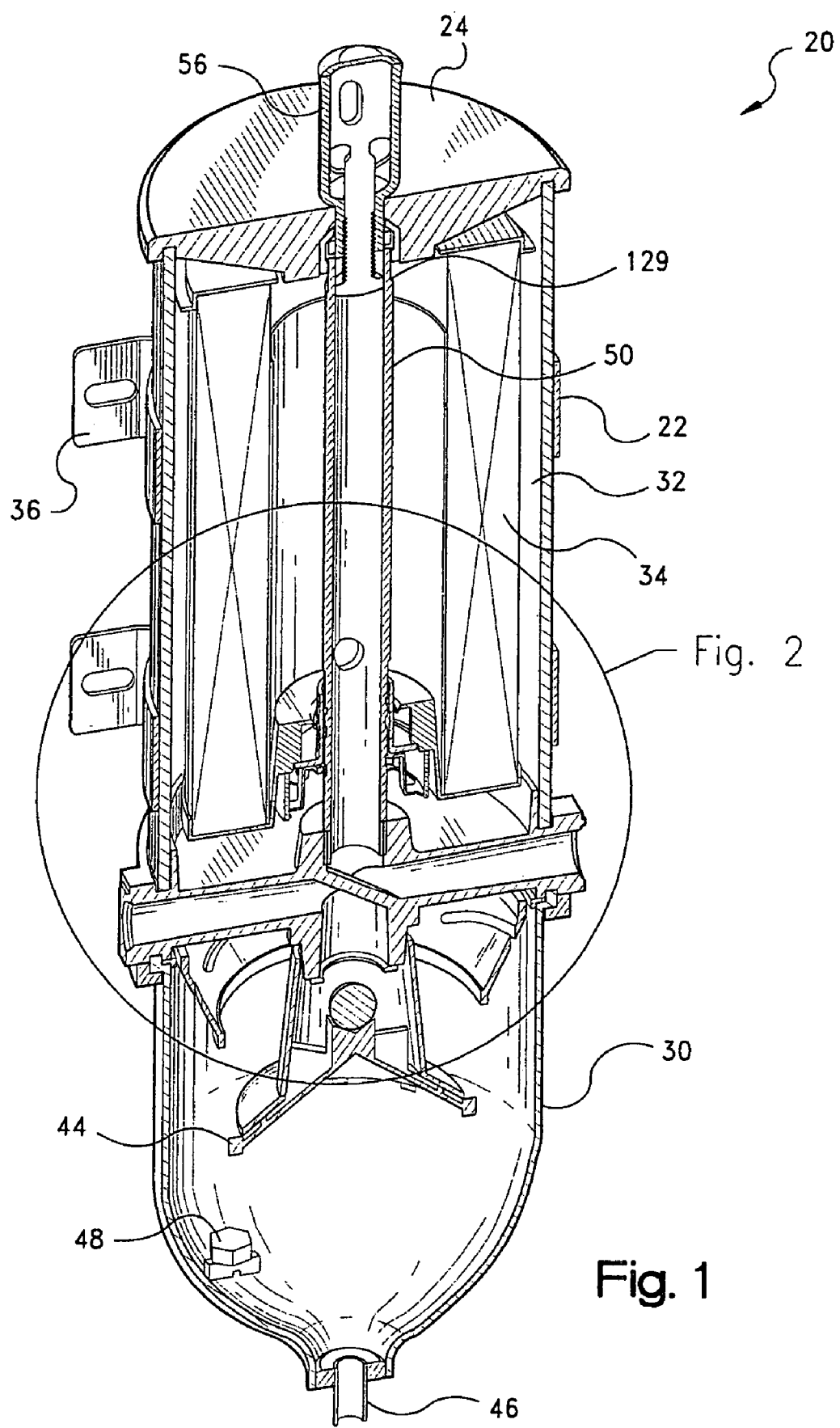
FIG. 1 is a cross-sectional elevated perspective view of a first embodiment of the fuel filter constructed according to the principles of the present invention.
Figure 2:
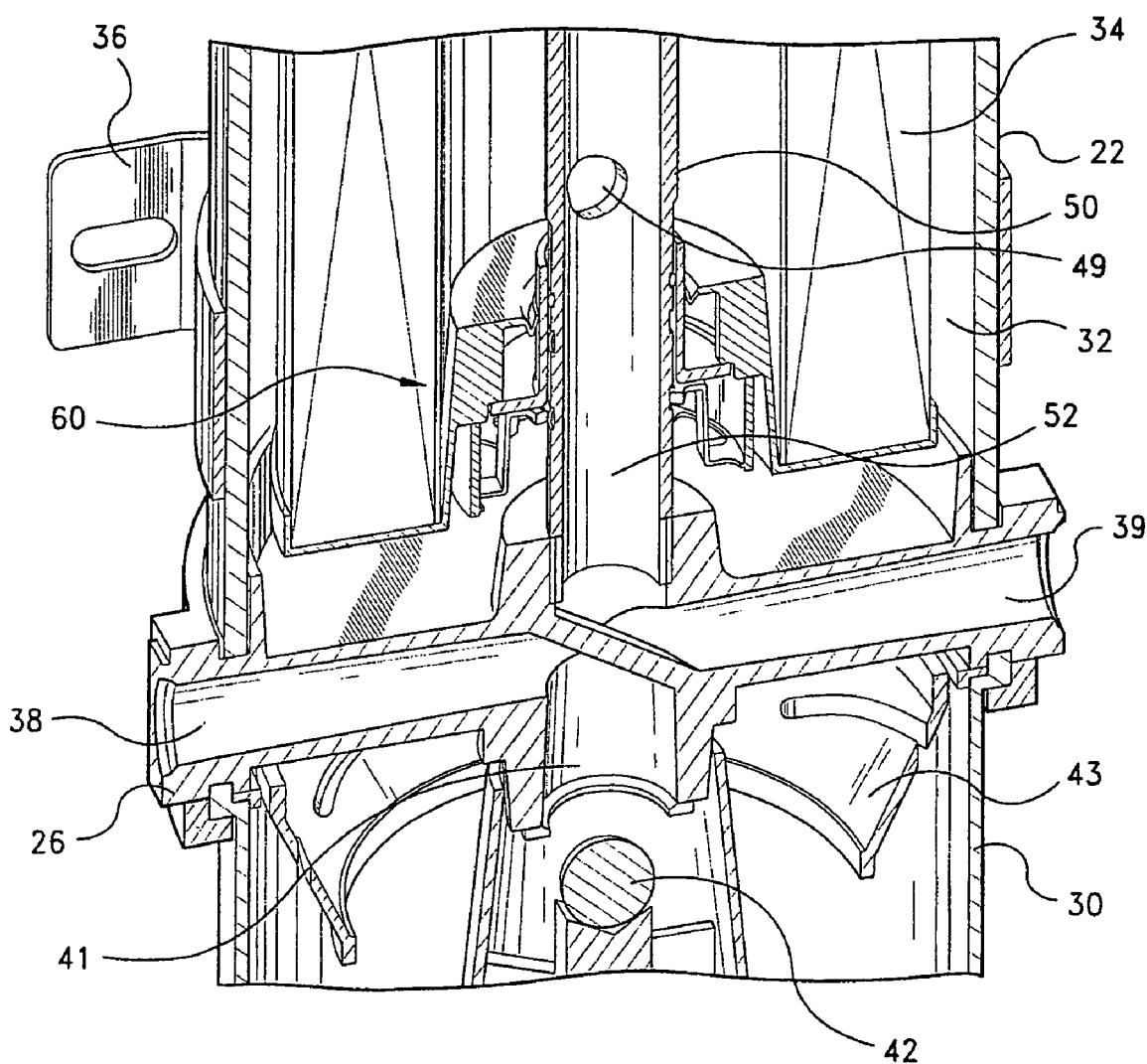
FIG. 2 is an enlarged cross-sectional elevated perspective view of a portion of the fuel filter shown in FIG. 1.
Figure 5:
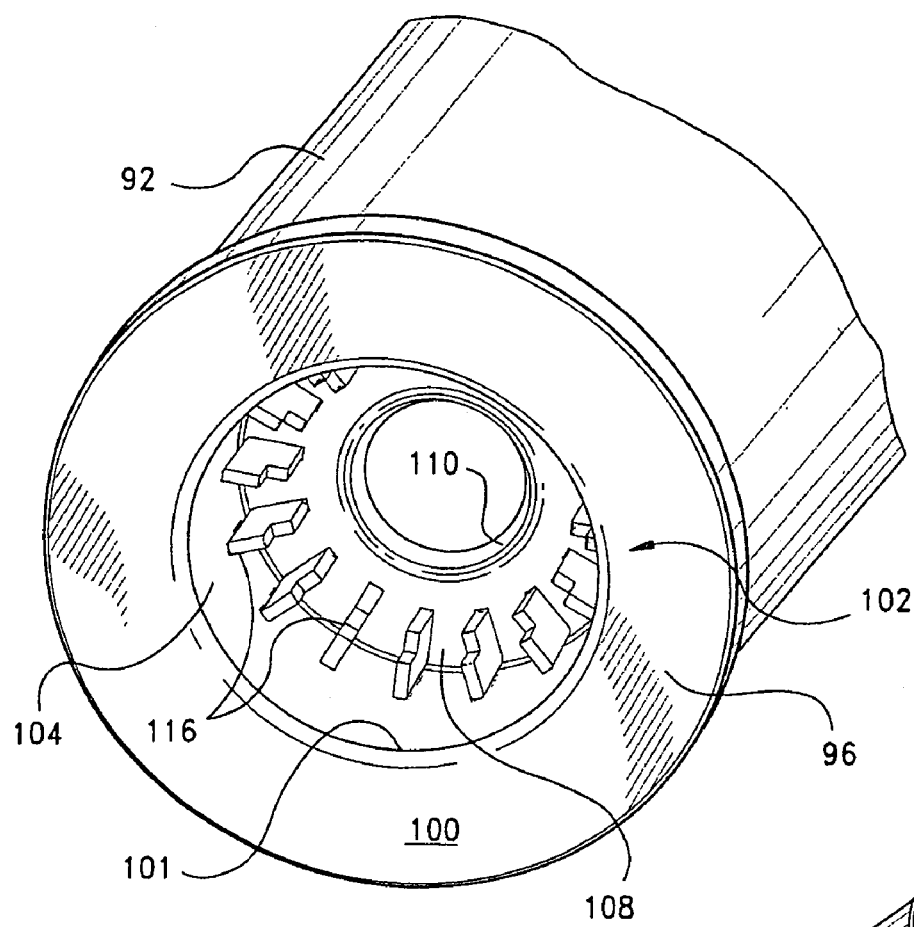
FIG. 5 is an perspective view of the lower end cap of the filter element for the filter assembly.

Referring now to the drawings, and initially to FIGS. 1–4, a first embodiment of a fuel filter constructed according to the principles of the present invention is indicated generally at 20. The fuel filter 20 is particularly suited for filtering water and other particulates and contaminants from fuel (e.g., diesel fuel), but is generally appropriate for separating any low density fluid from a higher density fluid. The filter 20 of the first embodiment includes a housing 22 with a lid 24 mounted to one end of the housing, and an annular body 26 with a collection bowl 30 mounted to the other end of the housing. The housing 22, lid 24 and annular body 26 define an interior cavity 32 for a removable filter element 34. Housing 22 can include appropriate mounting flanges or brackets 36 or other means to allow the housing to be mounted to an appropriate location in the fluid system. Housing 22, lid 24, annular body 26 and collection bowl are formed from materials appropriate for the particular application, as should be known to those skilled in the art.

Annular body 26 includes an inlet port 38 and an outlet port 39, which direct fuel into and out of the filter. Fuel directed through inlet port 38 is directed through passage 41 and into collection bowl 30. Valve ball 42 prevents backflow through the passage 41. The fuel initially passes through a funnel member 43, and then against a deflector turbine 44, which separates water in the fuel. The water collects in the bottom of the collection bowl and can be periodically removed from the housing through drain 46. A water sensor 48 can also be provided in the collection bowl.

The fuel then flows upwardly around the funnel 43, around the passages forming ports 38 and 39, and around the exterior of filter element 34. The fuel then flows radially inward through the filter element, and into an opening 49 in a central cylindrical standpipe 50. Opening 49 is located toward the lower end of the housing, preferably below the typical level of fuel in the housing to prevent air passing downstream in the system. Standpipe 50 is connected at its lower end to the annular body 26, such that the fuel flows through an interior passage 52 in the standpipe 50 and out through the outlet port 39. Standpipe 50 can be easily connected to annular body 26 such as with cooperating threads as at 53. Contaminants and particles collecting on the exterior surface of the filter element fall down into the collection bowl 30, from which they can be periodically removed through drain 46.

When the element 34 is to be replaced, a clamp 56 fixing the lid 24 to housing 22 is removed. Standpipe 50 extends centrally through the housing to the open end and provides an easy attachment device for clamp 56 to retain the lid in fluid-tight relation with the housing. In any case, when the clamp 56 is removed, the lid 24 can then be removed, and the element 34 accessed, removed from the housing, and replaced with a fresh element.

Further discussion of the assembly described above can be found in U.S. Pat. No. 3,931,011, owned by the assignee of the present invention. It should be appreciated that the assembly illustrated in FIGS. 1–4 is only exemplary in nature, and other types of filter housings and associate components could be used with the present invention.

In any case, a valve structure, indicated generally at 60, is provided toward the lower end of the housing. The valve structure 60 surrounds the central standpipe 50, and controls the flow of fluid through opening 49. An outwardly-facing locking groove 62 is provided proximate to, and below the opening 49. A second groove below opening 49 carries an O-ring 63. Referring now to FIGS. 3 and 8–11, the valve structure 60 includes a valve device, indicated generally at 64, and a latch device, indicated generally at 68. The valve device 64 includes an annular sleeve 70, which is dimensioned to closely fit around the standpipe 50. The upper end surface 71 (FIG. 8) of the sleeve 70 can have a chamfer or taper to facilitate the movement of the sleeve along the standpipe.

A relatively thin and flat annular base 72 is provided at the lower end of sleeve 70, and projects radially outward therefrom. A series of radially-projecting supports 74 extend between the base 72 and sleeve 70 to provide support for the base. Four such supports are illustrated, however, this can vary depending upon the application, and some applications may not even require such supports.

A plurality of radially-outward projecting tabs, as at 76, extend outwardly in a common plane from the annular base of the sleeve. Twelve of such tabs are illustrated, although supports 74 take the place and function of the tabs at their particular locations, such that essentially sixteen of such keys are shown. The tabs 76 are illustrated as being equally-spaced around the periphery of the base, and define a series of slots, as at 78. Tabs 76 and slots 78 have essentially rectangular configurations, however the geometry, as well as the number and location of the tabs and slots, can vary depending upon the particular application, as will be described below. Preferably, the valve device, including the sleeve 70, annular base 72, and tabs 76, is formed unitarily in one piece from inexpensive material (e.g., plastic).

The latch device 68 includes a plurality of fingers, as at 80, in an evenly-spaced, annular arrangement, surrounding the standpipe 50. Fingers 80 each have radially-inward projecting distal ends as at 82, which bound a cylindrical projection (see e.g., FIG. 10) slightly smaller than the standpipe, such that the fingers are each forced slightly outwardly when the latch device is received around the standpipe (see e.g., the right side of FIG. 4). The fingers 80 are connected at their lower ends to the lower end of an annular sleeve 84, and extend radially-inward from the sleeve, then axially-upward, and finally radially inward at the distal ends 82. The geometry of the fingers 80 makes them somewhat resiliently deflectable in the radial direction, although they have good axial rigidity. The number, dimension and location of fingers 80 can also vary depending upon the particular application, as will be described below, although it is preferred that at least three equally-spaced fingers are provided. Eight equally-spaced fingers, as illustrated, is even more preferred.

Sleeve 84 is radially-outwardly spaced from the fingers, and extends upwardly from the connection with the fingers to an upper annular engagement surface 86. A spring stop is defined by an annular surface 87 at the lower end of the sleeve 84. The latch device, including fingers 80 and sleeve 84, is also preferably formed unitarily in one piece from inexpensive material (e.g., plastic).

Figure 3:
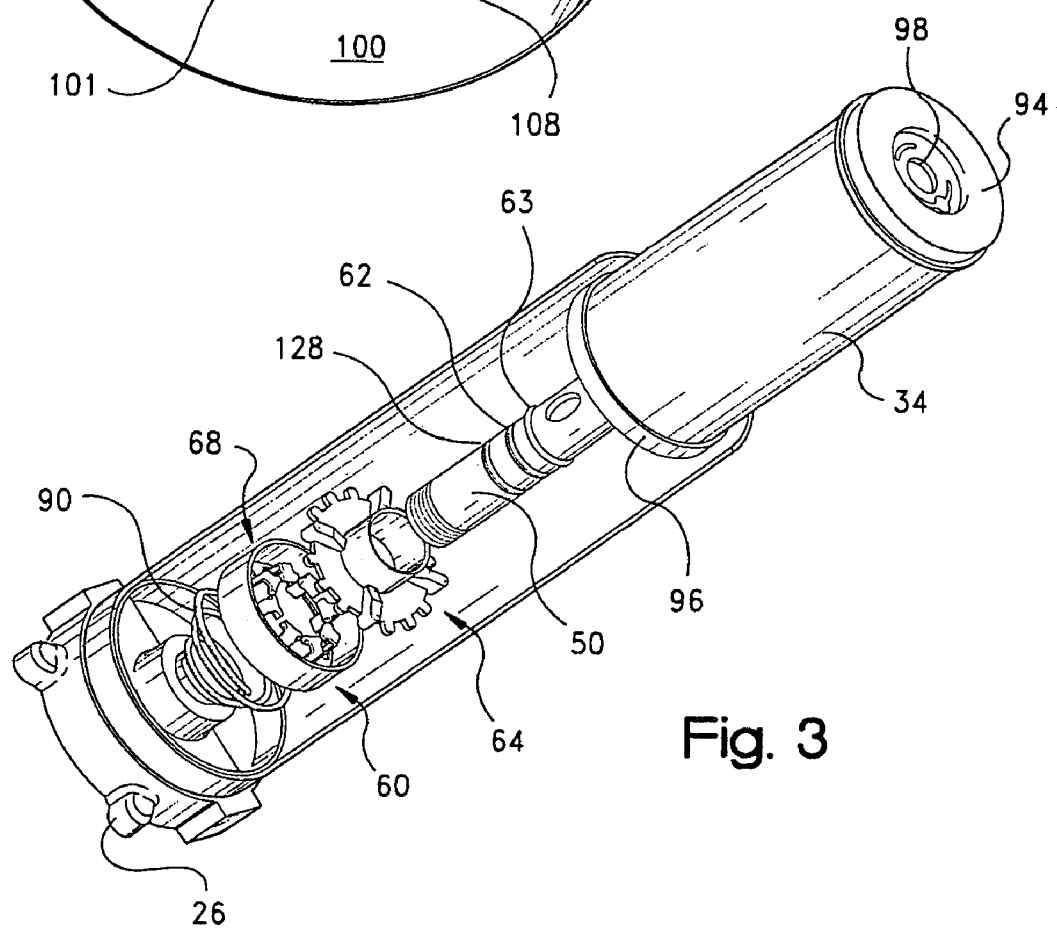
FIG. 3 is an exploded view of certain components of the fuel filter of FIG. 1.
Figure 4:
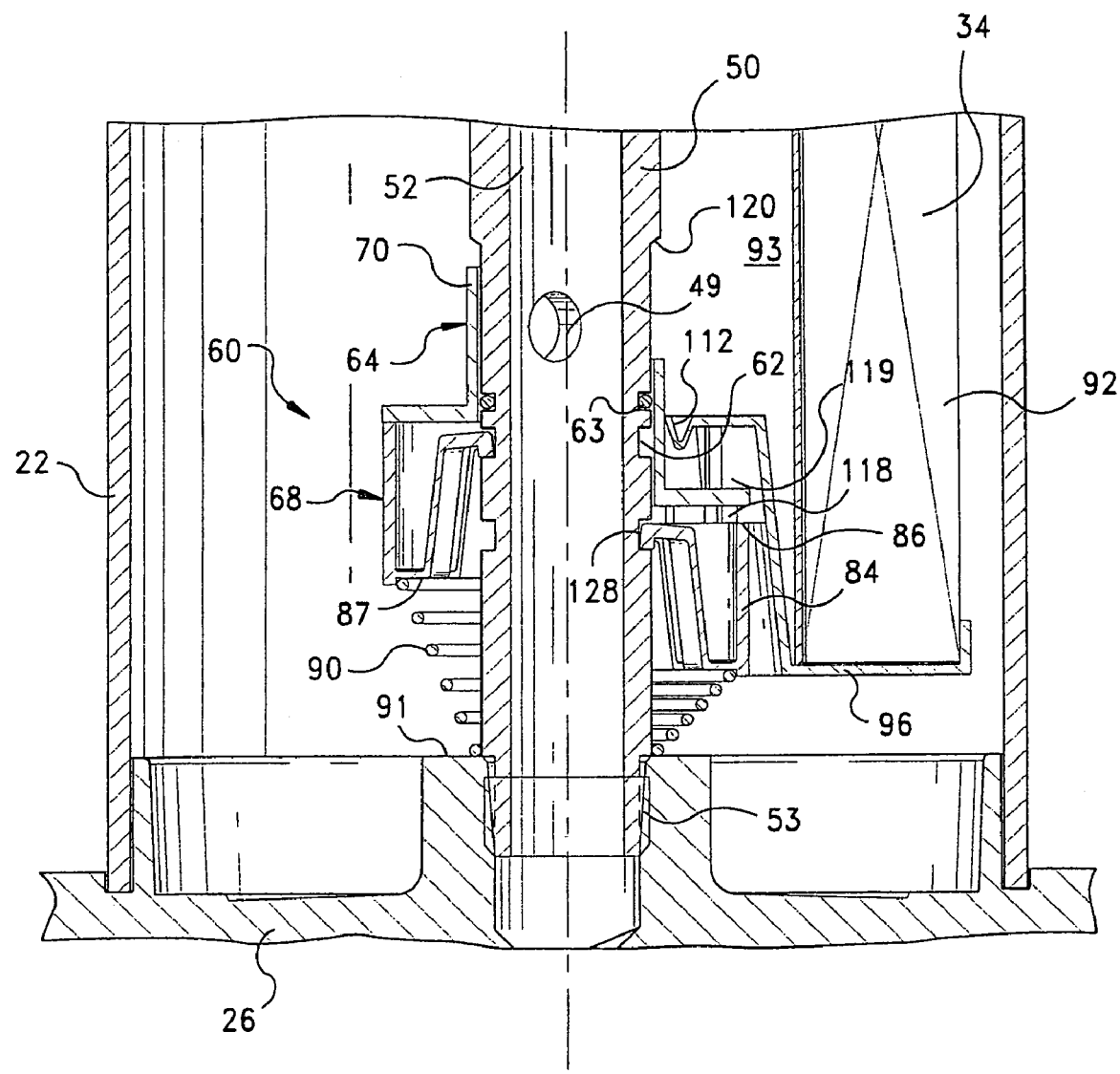
FIG. 4 is a cross-sectional side view of a portion of the fuel filter of FIG. 1, illustrating the open and closed positions of the valve structure.

As illustrated in FIGS. 3 and 4, the latch device 68 is located between the valve device 64 and the annular body 26 at the lower end of the filter housing. The latch device is oriented such that the engagement surface 86 faces upwardly and in contact with the lower surface of the base of the valve device. The valve device 64 and latch device 68 can be easily slipped over the lower end of standpipe 50 before the standpipe is fixed to (screwed into) the annular body 26.

A compression spring 90 is provided around the standpipe 50, and extends between the spring stop 87 (FIG. 11) on sleeve 84, and the upper surface 91 of the annular body 26, which defines an opposing spring stop. The spring 90 urges the latch device 68 upwardly toward the valve device 64, and hence urges the valve device 64 upwardly such that the sleeve 70 of the valve device normally is in blocking relation to the opening 49. In this closed position (see the left side of FIG. 4), the distal ends 82 of fingers 80 are received in the groove 62 in the standpipe, to lock the latch device with respect to the standpipe, i.e., to prevent the latch device from moving axially along the standpipe. This also prevents the valve device 64 from moving, at least axially downward, and thereby keeps the opening 49 fluidly closed by the sleeve 70. The axially upper and radially inner edge of the distal ends 82 of the fingers can have a slight chamber or curve (see FIG. 9) to facilitate the finger moving into the groove 62.

Referring now to FIGS. 3–7, the filter element 34 includes a ling shaped media 92 circumscribing a central axis "A", and having a central cavity 93. The element is bounded at one end by a first or upper end cap 94 and at the other end by a second or lower end cap 96. Ring-shaped media 92 can be any media appropriate for the particular application, including cotton, paper, cellulose, glass fiber, etc., and can be in any particular structure that is appropriate, such as single layer, multi-layer, pleated, non-pleated, etc. The end caps 94 and 96 have a generally round, flat shape and are fixed in a fluid-tight manner to the ends of the media such as by an adhesive or other appropriate bonding compound.

Upper end cap 94 has an annular configuration, with a central opening 98 (FIG. 3) dimensioned to closely receive the standpipe 50. Upper end cap 94 is preferably formed unitarily from an appropriate material, such as an inexpensive plastic.

Lower end cap 96 likewise has an annular configuration, with an annular portion 100 fixed to the lower end of the media and defining a central first opening 101. The lower end cap 96 also has a valve-actuating portion, indicated generally at 102. The valve-actuating portion 102 includes a cylindrical portion 104 bounding the central opening 101 and extending axially inward into the central cavity 93 to a distal inner end. A flat annular base 108 extends radially inward from the distal inner end of the cylindrical portion, and defines a central second opening 110. Central opening 110 in base 108 is co-axial with, but radially smaller than, central opening 101 in annular portion 100. Central opening 110 has a dimension so that it is closely received about sleeve 70 of valve device 64 (see FIG. 4). A flexible lip 112 (FIGS. 4, 6) can be provided around opening 110 to provide a fluid-tight seal with the sleeve.

A plurality of keys, as at 116, are provided internally of the valve-actuating portion 102. Keys 116 are illustrated as thin and flat strips, with opposing planar side surfaces facing essentially perpendicular to the central axis of the element. The keys are also illustrated as being equally-spaced in a spoke-like arrangement around the interior of the valve-actuating portion. Each key has one radially outer edge attached directly to the cylindrical portion 104 and another axially inner edge attached directly to the annular base 108, although the keys could be attached to just one of these elements. It is noted that the terms "axially inner" and "axially outer" define axial positions relative to a center of the ring shaped media 92 lying midway between end caps 94, 96 along the central axis A, and that the terms "radially inner" and "radially outer" define radial positions relative to the central axis A of the ring shaped filter media. One free edge of each key extends axially outward, away from the annular base 108, while another free edge extends radially inward from the cylindrical portion toward the central axis to bound an imaginary cylinder circumscribing the central axis and located radially between the first central opening and the second central opening. The free edges of the keys preferably terminate axially prior to the annular portion 100, and radially outward from the central opening 110 (but, of course, radially inward of central opening 101).

Figure 6:
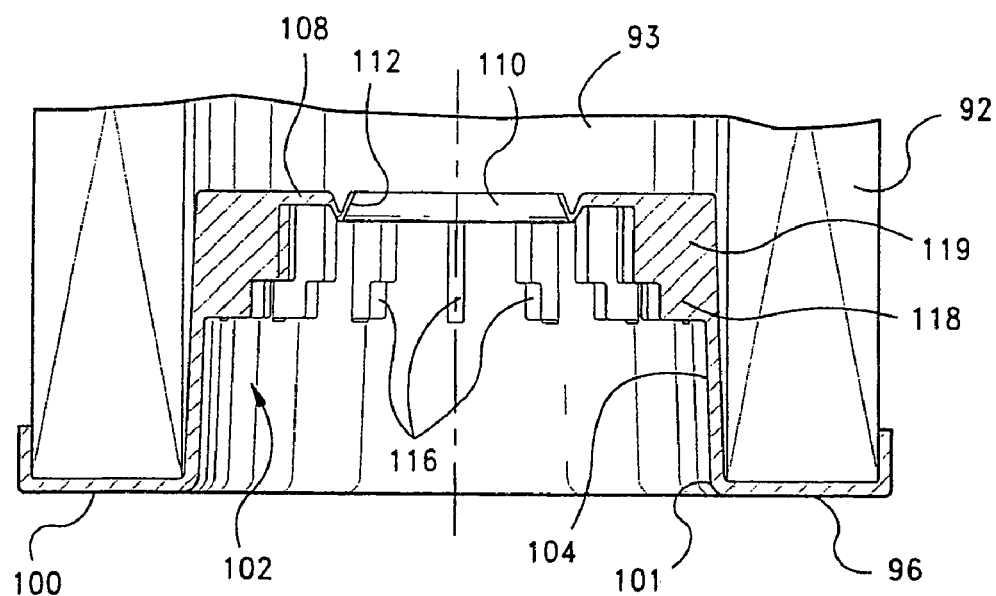
FIG. 6 is a cross-sectional side view of a portion of the filter element.
Figure 7:
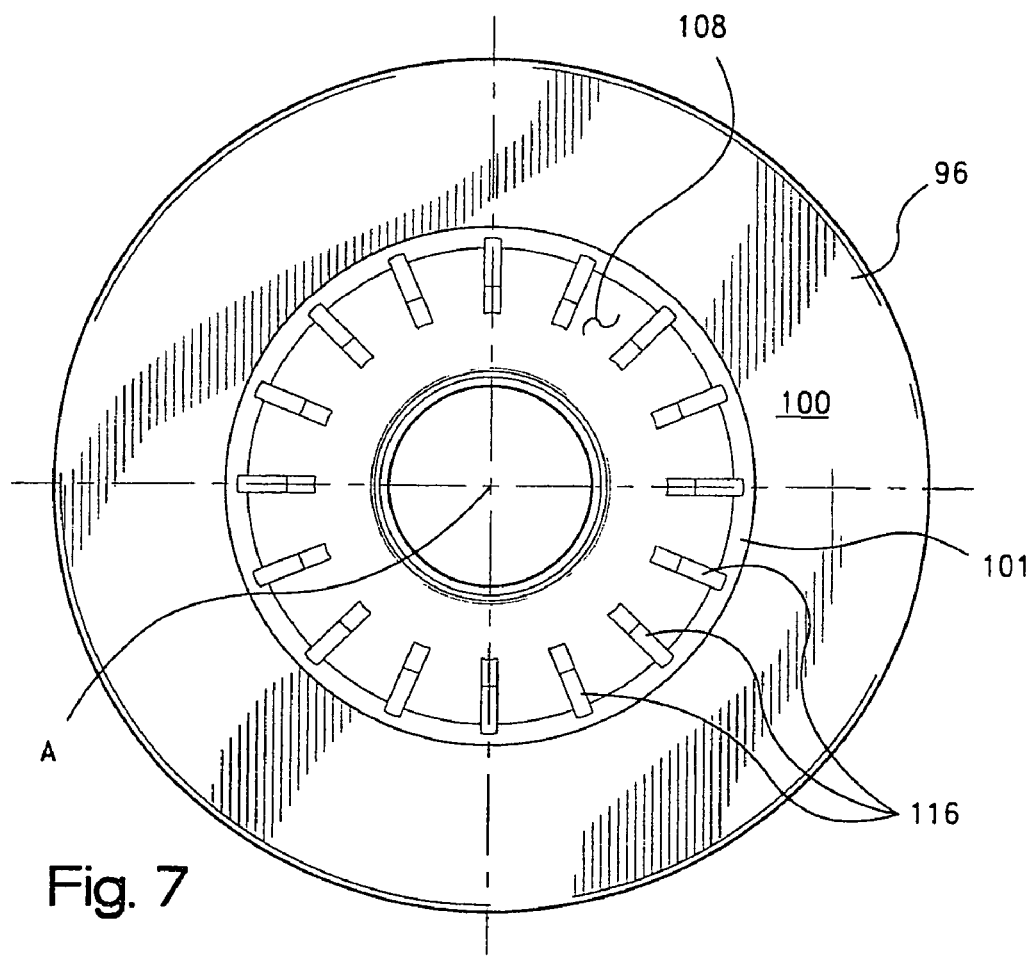
FIG. 7 is a bottom view of the lower end cap for the filter element.
Figure 8:
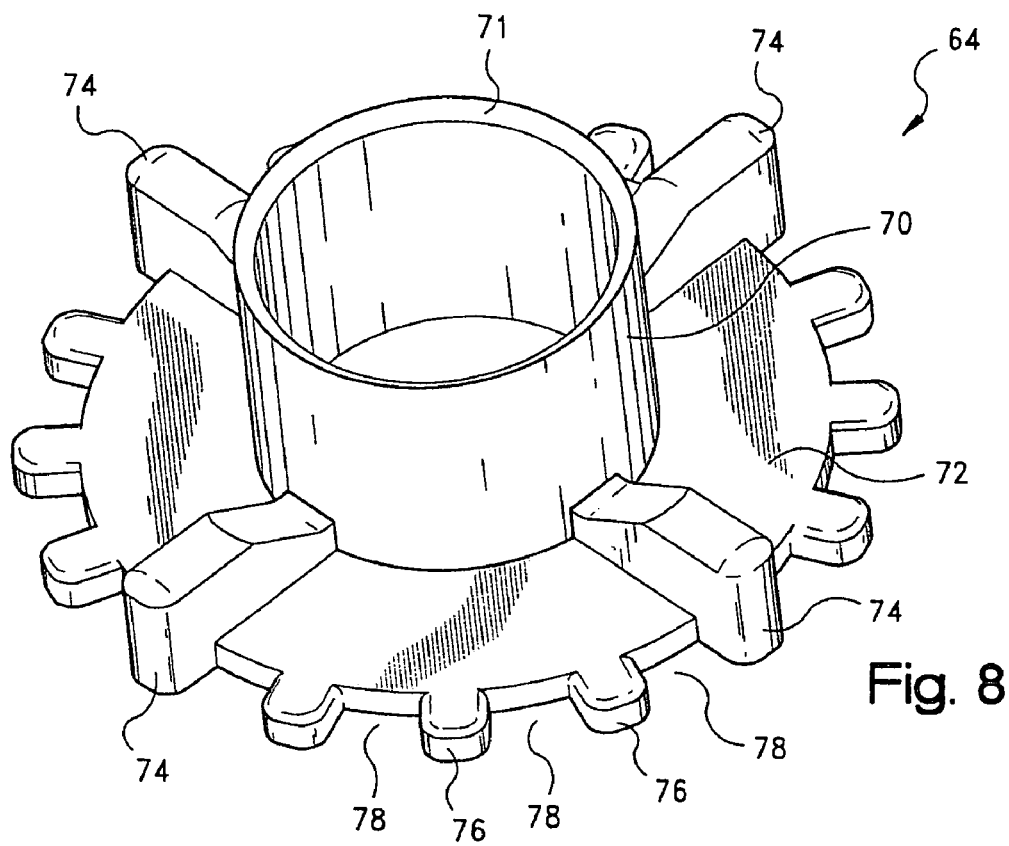
FIG. 8 is an elevated perspective view of the valve device for the fuel filter.
Figure 9:
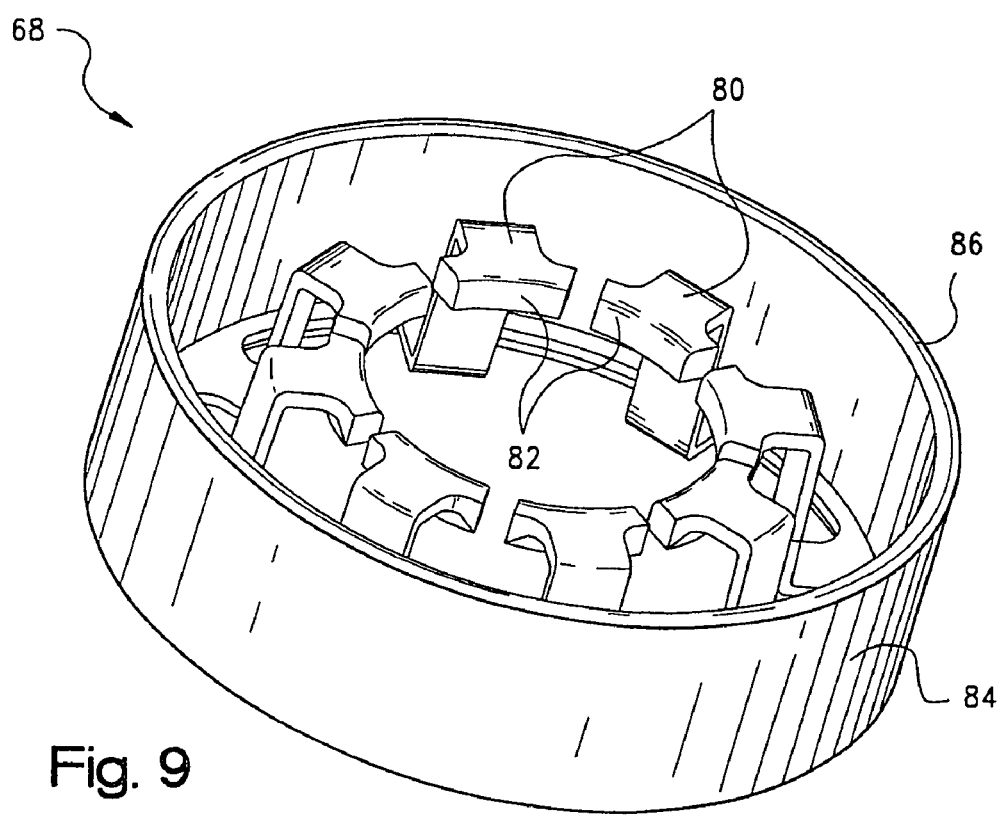
FIG. 9 is an elevated perspective view of the latch device for the fuel filter.
Figure 11:
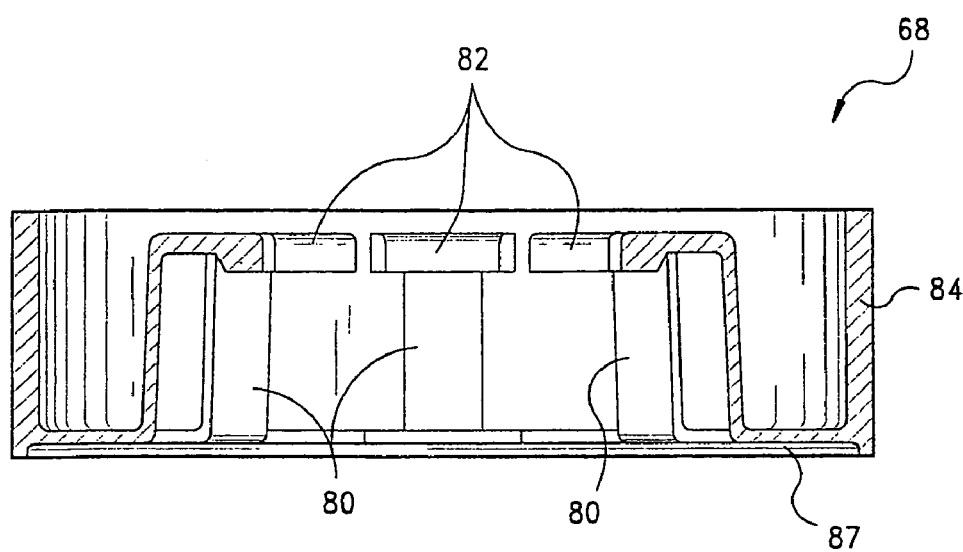
FIG. 11 is a cross-sectional side view of the latch device.
Figure 10:
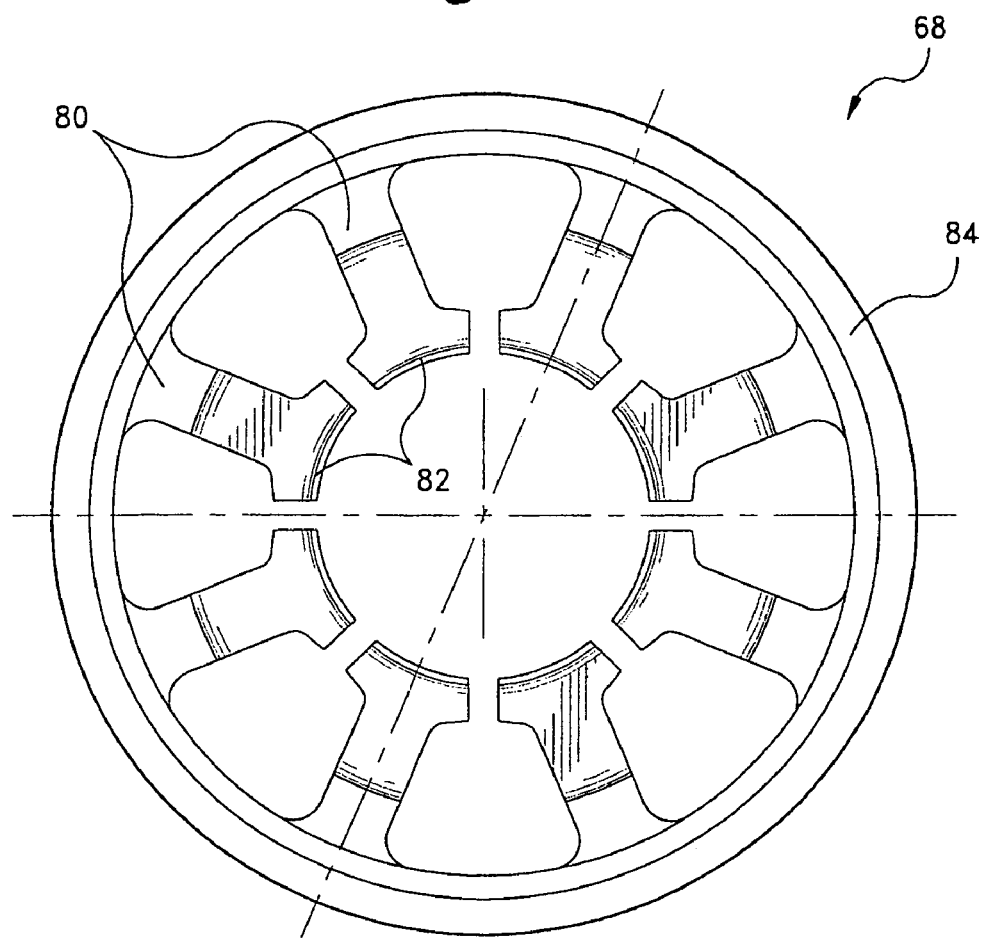
FIG. 10 is a top view of the latch device.
Figure 12:
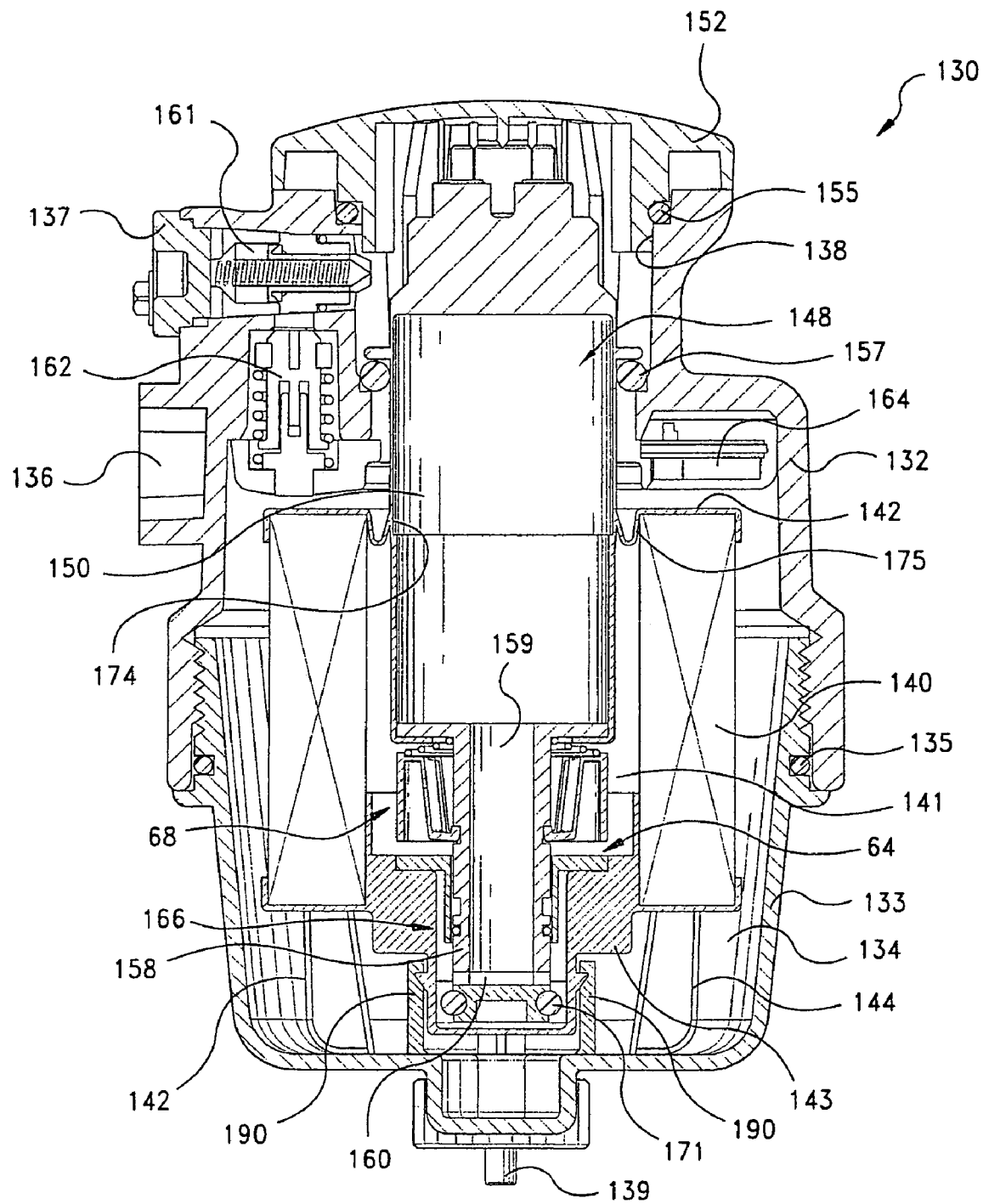
FIG. 12 is a cross-sectional view of a second embodiment of the fuel filter.
Figure 14:
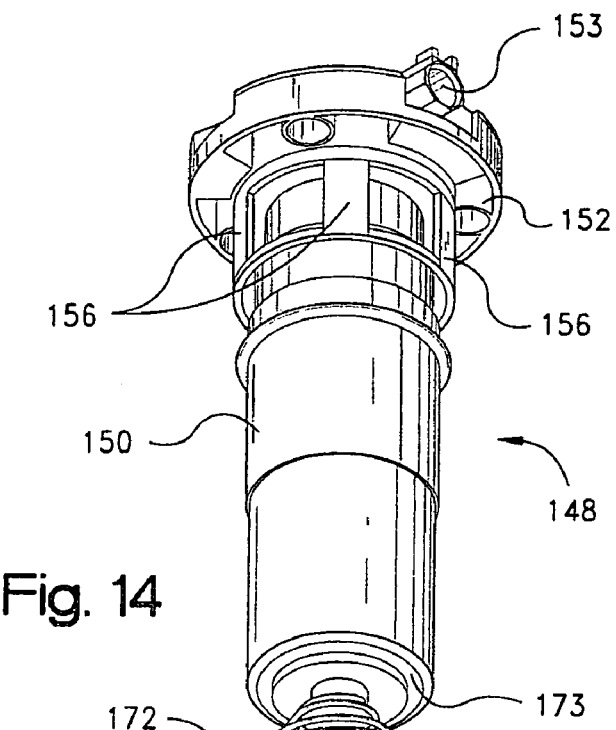
FIG. 14 is a view similar to FIG. 13, but with an exploded view of the valve structure.
Figure 13:
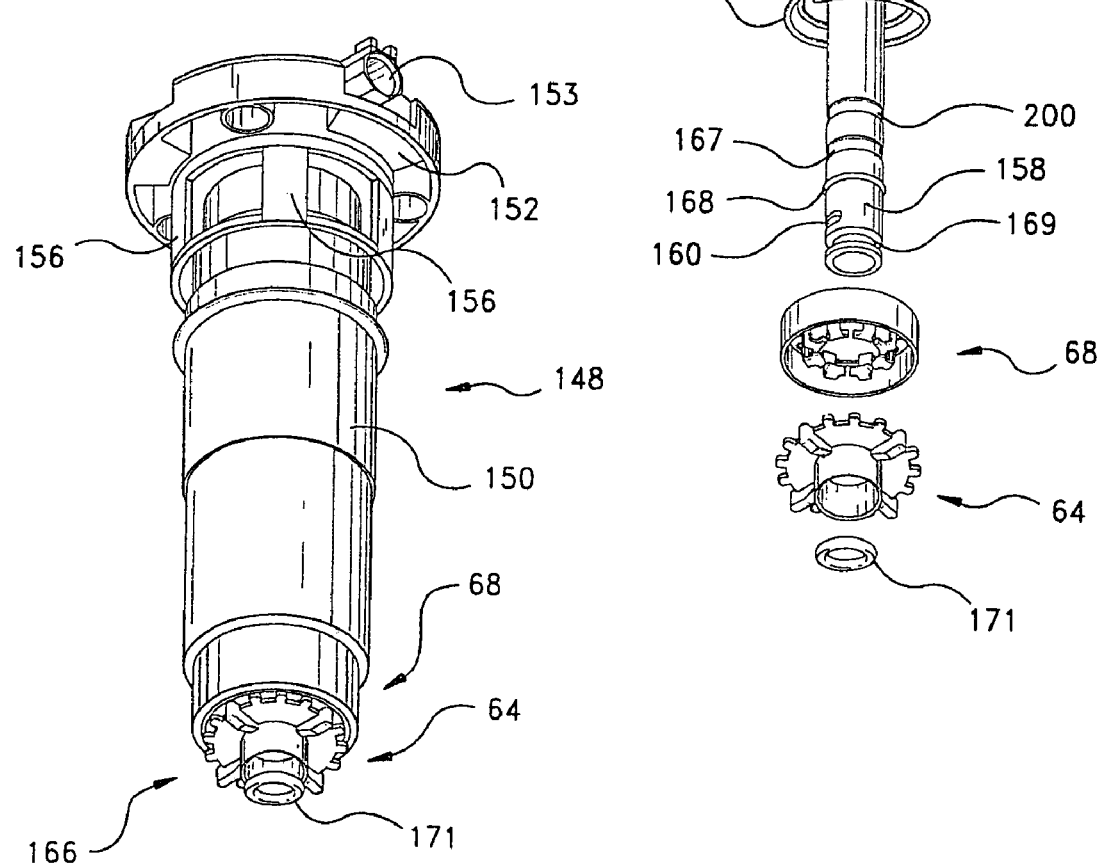
FIG. 13 is an elevated perspective view of the pump assembly and valve structure for the fuel filter of FIG. 12.

Each key can have a "step", that is, an axially longer and radially thinner portion as at 118, and an axially shorter and radially wider portion as at 119 (see FIG. 6). The reason for such a step will be explained below. Alternatively, each key could be simply straight, and extend radially inward from the cylindrical portion 104 and axially outward from the base 108 the same amount over the length and width of the keys. While sixteen of such keys 116 are illustrated, the number, location and dimension of the keys can vary depending upon the particular application. It is possible in some applications that only a single key may be necessary, but it is preferred that at least three keys be provided, and more preferably that a significant number of keys (such as sixteen) be provided, to accomplish the features of the present invention.

The lower end cap 96, including the annular portion 100 and valve actuating portion 102 (including keys 116) is also preferably formed unitarily from an appropriate material, such as an inexpensive plastic. Keys 116 are relatively simple to manufacture integral with the valve actuating portion, such as by using common molding techniques. The valve device 84 and latch device 86 are likewise easy to form using common molding techniques.

The keys 116 on the end cap 96 of the filter element, and the tabs 76 and slots 78 on the latch device 64 are arranged such that when the filter element is inserted into the housing 22, at least a portion of the keys can fit through the slots 78. As shown in FIG. 4, the axially longer and radially thinner portions 118 of the keys fit through the slots in the latch device and engage the annular engagement surface 86 of the sleeve on the underlying valve device. The supports 74 around the base 72 of the valve device assist in orienting the keys with the slots. As the element is inserted into the housing, the lower free edges of the keys press down against the sleeve 84 of the latch device, and cause the latch device to bend outwardly and pull the fingers 80 radially outward from the standpipe. As the fingers are pulled outward, the distal ends 82 of the fingers are pulled outward from groove 62, thus releasing the latch device and allowing the latch device to slide axially downward along the standpipe. Again, it is possible that only a single key extending through the slots in the latch device may suffice to unlock the latch device, although that this may cause cocking of the element and/or the latch device, and so at least three equally-spaced keys are preferred.

In any case, simultaneously with the fingers being released by the engagement of the keys against the sleeve, the radially wider and axially shorter portions 119 of the keys engage the upper surface of the annular base 72 of the valve device and push the valve device axially downward along the standpipe. The keys are dimensioned to push the valve device downward sufficient to fully uncover opening 49 (see the right-hand side of FIG. 4). After the element is installed, fluid can pass through opening 49 in the standpipe, and thus pass to outlet port 39. Since the opening 49 is located toward the lower end of the housing, typically below the level of fuel in the housing, this reduces the chance of pulling air in the system when the opening 49 is uncovered.

It should be appreciated that only one or two of the key(s) 116 may have a radially wider and axially shorter portion as at 119 to engage the upper surface of the base 72 of the valve device, however it is possible that this may also cause cocking of the valve device and/or element, and so it is preferred that the keys have at least three of such portions to engage the valve device. Alternatively, if the keys are straight, the keys could merely extend through the slots 78 and engage the sleeve of the latch device 68 to unlock the latch device from the standpipe, while the base 108 of the end cap 96 could engage other structure, such as supports 74 on the valve device 64, to cause the valve device to move downwardly.

It should also be apparent that there are many combinations of keys, slots and tabs that will perform the results of the present invention. It is merely necessary that the keys each have some configuration that fits between the slots to engage the latch device 68 and the valve device 64.

The sealing lip 112 around the base 108 of the end cap seals to the sleeve 70 of the valve device before the opening 49 is uncovered, thereby preventing unfiltered fuel and contaminants from entering opening 49 along the exterior of valve sleeve 70. Likewise, O-ring 63 provides a fluid-tight seal between standpipe 50 and sleeve 70 during the sliding movement of the sleeve along the standpipe to prevent unfiltered fuel and contaminants from reaching opening 49 along the interior of valve sleeve 70.

A groove 128 can be provided in the exterior surface of standpipe 50 to receive the distal ends 82 of fingers 80 when the valve device is in its open position. Groove 128 can have an upper chamfered or tapered edge to facilitate the movement of the distal ends 82 of fingers 80 into and out of the groove. Since the valve device is normally in an open position, this prevents the fingers from taking a set over time, and assures that the fingers will properly engage the locking groove 62 when the valve device is moved to its closed position. The downward movement of the element can be limited by an annular shoulder 129 (FIG. 1) on the upper end of standpipe 50 which engages the upper end cap 94 to prevent the element from pushing the valve element too far down along the standpipe.

As indicated above, the dimensions, number and location of the tabs and slots in the latch device, and the number and location of the keys on the end cap, determine the correct fit of the filter element in the housing. The dimensions, number and location of the keys, tabs and slots can be chosen such that only particular filter elements are only insertable in certain housings. This allows control over the type of element useable with a housing and prevents the filter from being used without a filter element.

When it is desired to remove the filter element and replace the filter element with a fresh element, the lid 24 of the housing is removed, and the element is simply pulled out of the upper end of the housing. As the element is removed, the spring 90 assists in moving the element upwardly, as well as moving the latch device and valve device upwardly such that the valve device again closes the opening 49. The spring 90 also provides a bending moment on the latch device to force the fingers back into groove 62 to lock the latch device along the standpipe. The opening 49 is closed by valve sleeve 70 before the annular base 108 of the end cap unseals from the valve sleeve, which prevents unclean fuel and contaminants from entering the opening. The close contact between sleeve 70 and standpipe 50 also provides point contact to prevent fluid leakage into opening 49. A shoulder 120 on standpipe 50 limits the upward movement of the valve sleeve.

According to a second embodiment of the present invention, as illustrated in FIGS. 12–16, the fuel filter, indicated generally at 130, can include a pair of mateable housing portions 132, 133, which define an interior cavity 134. The housing portions 132, 133 are threadably connected, and an O-seal 135 can be provided between the housing portions to ensure a fluid-tight seal. An inlet 136 and an outlet 137 are provided in the upper housing portion 132, and the upper housing portion includes an opening 138 for receipt of a pump assembly. Lower housing portion 133 serves as a collection bowl, and includes a drain 139. A water sensor (not shown) can also be provided in the lower housing portion, as in the first embodiment.

A filter element 140 is mounted within the housing portions and comprises a ring-shaped media circumscribing a central cavity 141. Filter element 140, similar to filter element 92 in the first embodiment, can be any filter media appropriate for the particular application, and includes an upper or first annular end cap 142 and a lower or second annular end cap 143. The end caps 142, 143 are bonded to the media in an appropriate manner. The filter element 140 is supported on a series of flanges or ribs 144 integral with the lower housing portion.

A pump assembly, indicated generally at 148, is also mounted between the housing portions, and includes an electric pump 150 with integrated drive motor, and an upper cap or cover 152 having an electrical connection 154 for the motor. Pump 150 can be any conventional type of pump appropriate for the particular application. One such pump is available from AIRTEX PRODUCTS of Fairfield, Ill., with a flow rate of 110 Liters/Minute at 60 psi. Cover 152 is removeably attached to pump 150 with a series of spring fingers 156. An O-ring 157 is provided between the pump 150 and the upper housing portion 132 to provide a fluid-tight seal. A cylindrical inlet or return pipe 158 with a central flow passage 159 extends downwardly from the pump, and has an opening 160 along the length of the pump near the inlet lower end to provide a passage for fuel to the pump.

The pump assembly 148 is received through opening 138 in upper housing portion 132, and is received in the cavity 141 of the filter element. Cover 152 is threadably and removeably attached to upper housing portion 132. An O-ring 155 can be provided between the cover 152 and upper housing portion 132 to provide a fluid-tight seal.

The filter 130 can include additional features, such as a pressure regulator 161, thermal valve 162 and heater 164 to control the flow and quality of the fuel entering and exiting the filter. These components are conventional in nature and will not be described herein for sake of brevity. The components are controllable through an exterior connection (not shown). In any case, fuel through inlet 136 passes around heater 164 and into filter element cavity 134. The fuel then passes radially inward through the filter element 142 and into the central cavity 141 of the element. Particulates and contaminants collect on the exterior surface of the filter element and fall down into the lower housing portion, and can be periodically removed through drain 139. The pump draws the fuel upwardly through the housing, where the fuel is then directed outwardly through the pressure regulator 161 to outlet 137.

When the filter element needs to be replaced, the lower housing portion 133 is removed, and the filter element can then be accessed, removed from the lower housing portion, and replaced with a fresh filter element. Similarly, when it is necessary to access the pump 150 for inspection and/or repair, cover 152 can be removed from the upper housing portion and the pump pulled out of the cavity 134.

A valve structure, indicated generally at 166, surrounds the inlet pipe from the pump assembly, and controls the flow of fuel through opening 160. An outwardly-facing locking groove 167 is provided proximate to, and above opening 160. A second groove above opening 160 carries an O-ring 168. A larger groove 169 is provided toward the lower end of the inlet pipe 158 (between the opening 160 and the end of the pipe), which carries a larger O-ring 171.

The valve structure includes the valve device 64 (FIG. 8) and latch device 68 (FIG. 9) as described above with respect to the first embodiment. The sleeve 70 of the valve device is dimensioned to be received closely around the inlet pipe 158 of the pump assembly, while the fingers 80 on the latch device closely surround the inlet pipe, and are biased somewhat inwardly so that they engage groove 167. The latch device and valve device are held on inlet pipe 158 by the relatively large O-ring 172 at the lower end of the pipe. The orientation of the valve device and latch device relative to each other remains the same as in the first embodiment, with the engagement surface 86 of the latch device facing the annular base 72 of the valve device, however the valve device and latch device are reversed (flipped over), as compared to the first embodiment, such that the valve device is located closer to the lower end of the housing than the latch device.

A compression spring 172 surrounds the inlet pipe 158 and extends between the spring stop 87 on the latch device 68, and the lower surface 173 of the pump 150, which defines an opposite spring stop.

As in the first embodiment, the upper end cap 142 of the filter element has an annular configuration with a central opening 174 dimensioned to closely receive pump 150. A flexible lip 175 can be provided around opening 174 (as in the first embodiment) to provide a fluid-tight seal with pump 150.

Figure 16:
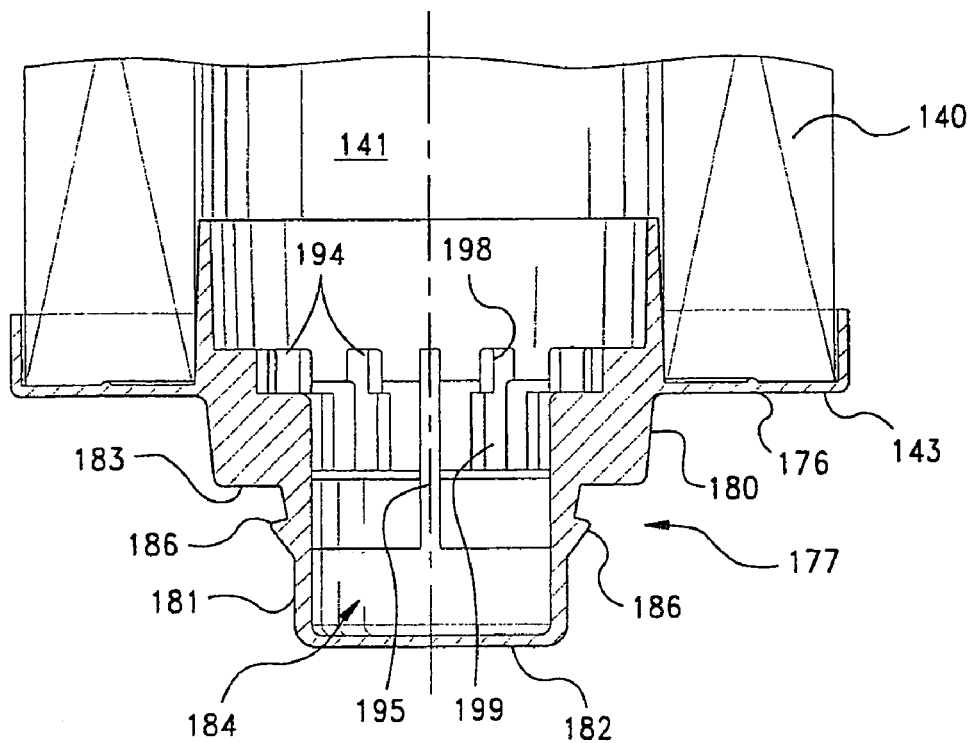
FIG. 16 is a cross-sectional side view of a portion of the filter element of the second embodiment.
Figure 15:
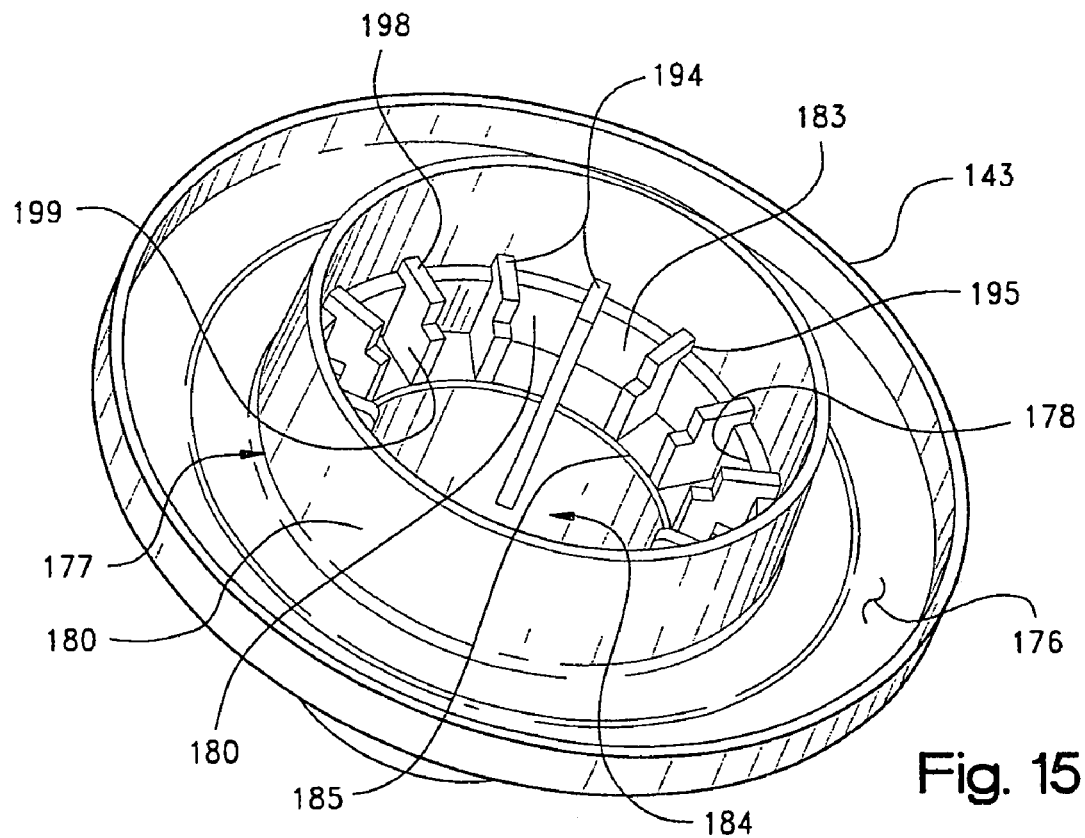
FIG. 15 is an elevated perspective view of the lower end cap for the fuel filter FIG. 12.

As shown best in FIGS. 15 and 16, the lower end cap 143 likewise has an annular configuration, with an annular portion 176 fixed to the end of the media, and a valve actuating portion, indicated generally at 177. The valve-actuating portion 177 bounds a central opening 178 defined by annular portion 176, and includes a cylindrical portion 180 extending axially inward into the central cavity 141 of the filter element to a distal end. The cylindrical portion 180 bounds the inner diameter of the media ring 140. A slightly smaller cylindrical portion 181 extends outwardly from the filter element and is closed by a flat, radially-extending end wall 182. The smaller cylindrical portion 181 extends downwardly from an annular base 183 provided radially inward of the annular portion 176. Cylindrical portion 181 and end wall 182 define a cup-shaped cavity 184, having an opening 185, indicated generally at 185, which receives the inlet pipe 158 of pump 150. O-ring 170 provides a fluid-tight seal between the inlet pipe 158 and the inside surface of cylindrical portion 181 (see, e.g., FIG. 12). O-ring 171 also provides vibration damping of the inlet pipe 158 within cylindrical portion 181.

One or more barbs 186 are provided on the exterior surface of the cylindrical portion 181, and project radially outward. Barbs 186 cooperate with fingers 190 extending axially upward from the lower end of the lower housing portion 132 to temporarily retain the filter element in the housing. The fingers 190 grasp the barbs 186 and hold the filter element in the lower housing portion, but allow the filter element to be uncoupled from the lower housing portion merely by pulling the filter element away from the lower housing portion.

A plurality of keys, as at 194, are provided internally of the valve-actuating portion 177 of the lower end cap 143. Keys 194 are illustrated as thin and flat strips, with opposing side surfaces, similar to the keys 116 in the first embodiment, and are equally-spaced in a spoke-like arrangement around the interior of the valve-actuating portion. Each key has one edge attached directly to the cylindrical portion 180 and another edge attached directly to the annular base 183, although again, the keys could be attached to only one of these components. Each key extends axially upward, away from the annular base 183, and radially inward from the cylindrical portion toward the central axis. Certain of the keys, such as at 195, can extend radially-inward and axially downward a greater extent to provide rigidity for the valve-actuating portion 177 as well as facilitate locating the keys of the filter element in the slots in the latch device.

As in the first embodiment, each key can have a "step", that is, an axially longer and radially thinner portion as at 198, and an axially shorter and radially wider portion as at 199. Again, each key can also be simply straight, and extend radially inward from the cylindrical portion 181 and axially outward from the base 183 the same amount over the length and width of the keys. The lower end cap, including the annular portion 176 and valve actuating portion 177 (with keys 194), is preferably formed unitarily in one piece (e.g., molded from plastic).

The keys 194 of the lower end cap 143 of the filter element, and the tabs 76 and slots 78 on the latch device 64 are arranged such that when the filter element is inserted into the housing, at least a portion of the keys can fit through the slots 78. The axially longer and radially thinner portions 198 of the keys fits through the slots 78 in the latch device and engage the engagement surface 86 of the sleeve 84 on the valve device. Similar to the first embodiment, as the element is inserted upwardly into the housing, the keys press against the sleeve 84, and cause the latch device to bend and pull the fingers 80 radially outward from the inlet pipe. As the fingers are pulled outward, the distal ends 82 of the fingers are pulled outward from locking groove 167, thus releasing the latch device and allowing the latch device to slide axially upward along the inlet pipe.

Simultaneously with the fingers 80 being released, the radially wider and axially shorter portions 199 of the keys engage the lower surface of the base 72 of the valve device to also push the valve device axially upward along the inlet pipe, thus uncovering the opening 160. Fuel can thereby flow through opening 160 and then to outlet port 137. The keys 194 provide flow paths for the fuel to flow from the radially-inner surface of element to the opening 160 in the inlet pipe. A groove 200 (FIG. 14) can be provided upwardly of the locking groove 167 to receive the distal ends of the fingers when the valve device is in its open position, such that the fingers do not take set over time. Groove 200 can have a chamfer or taper on its downward edge to facilitate the movement of the fingers out of the groove into its closed position.

As in the first embodiment, the dimensions, number and location of the tabs and slots in the latch device, and the dimensions, number and location of the keys 194 on the end cap, determine the correct fit of the filter element in the housing. The dimensions, number and location of the keys, tabs and slots, can be chosen such that particular filter elements are only insertable in certain housings. This allows control over the type of element useable with a housing.

When it is desired to remove the filter element and replace the filter element with a fresh element, the lower housing portion 133 is removed, and the element is simply pulled out from the lower end of the housing. As the element is removed, the spring 171 urges the latch device and valve device downwardly in the housing, such that the distal ends 82 of fingers 80 eventually engage groove 167, and lock the latch device along the inlet pipe. The valve device 64 is also moved axially downward into block relation with opening 160 along pipe 158. It is noted that the valve structure will likewise move to a closed position when the pump assembly is removed from the housing (but when the element is not changed).

Figure 17:
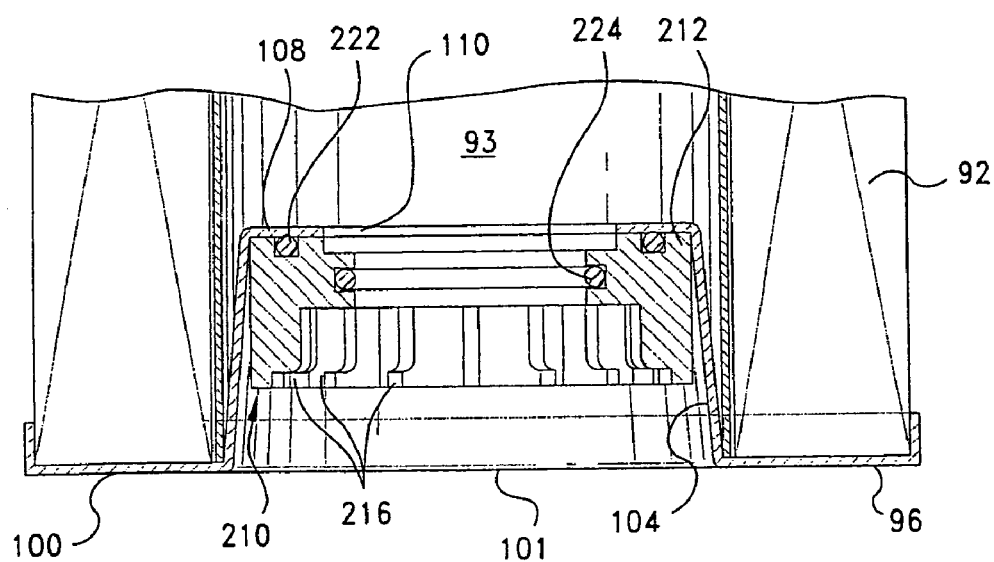
FIG. 17 is a cross-sectional side view of a portion of the filter element similar to FIG. 6, but showing a separate key device.
Figure 18:
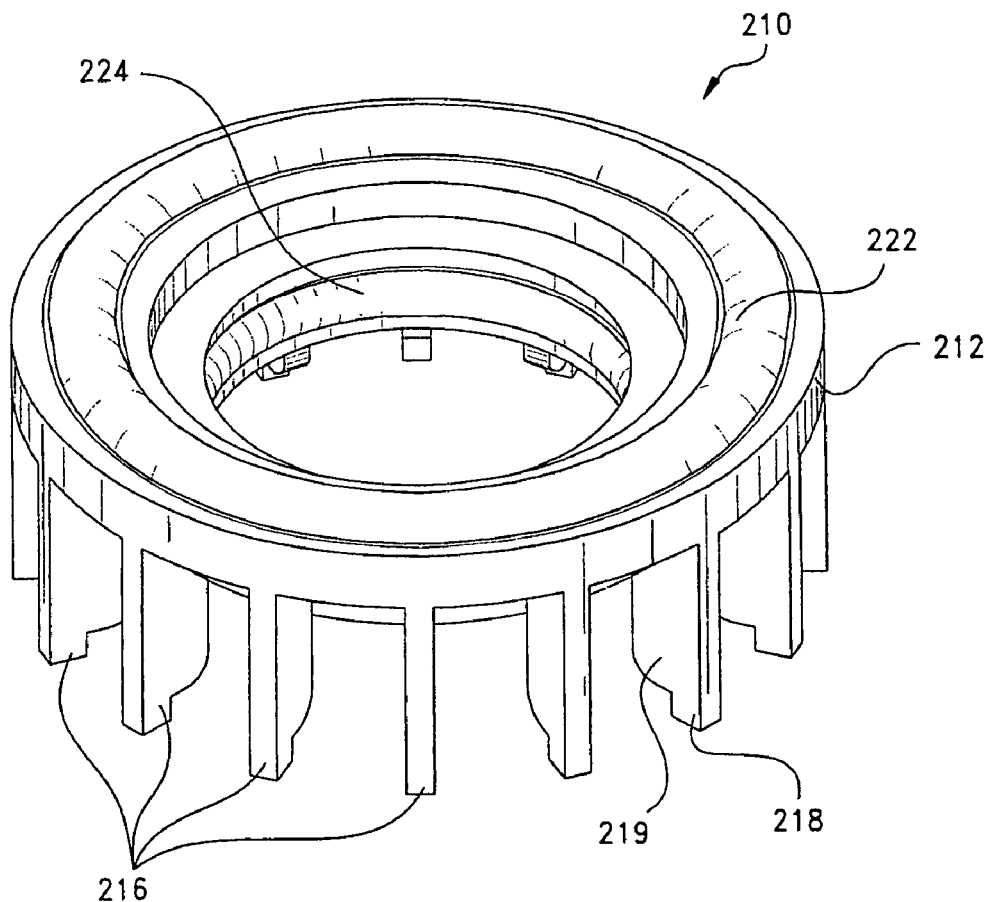
FIG. 18 is an elevated perspective view of the key device for the filter element of FIG. 17.

The keyed portion of the lower end cap 96 of FIG. 6 can alternatively be provided as a separate device, as indicated generally at 210 in FIGS. 17 and 18. The key device 210 includes an annular base 212 dimensioned to fit within the cylindrical portion 104 of the lower end cap and against base 110, and a plurality of thin, flat keys as at 216 projecting axially away from the annular base 212 and radially-inward toward the central axis of the filter element.

Keys 216 are similar to keys 116, and comprise thin and flat strips, equally-spaced in a spoke-like arrangement. Each key has one edge attached directly to the cylindrical base 212. One free edge of each key extends outward, away from the base 212, while another free edge extends radially inward toward the central axis of the filter element.

As with keys 116, each key can have a "step", that is, an axially longer and radially thinner portion as at 218, and an axially shorter and radially wider portion as at 219. Again, the number, location and dimension of the keys can vary depending upon the particular application.

An O-ring seal 222 is provided in a groove facing axially-outward from the upper flat surface of base 212, and provides a fluid-tight seal against annular base 108 of the lower end cap. A second O-ring seal 224 is provided in a groove facing radially inward from the annular base to seal against the valve sleeve.

The remainder of the lower end cap 96 is the same as described above, and includes annular portion 100 fixed to the lower end of the media 92, and cylindrical portion 104 bounding the central opening 101 and extending axially inward into the central cavity 93 to a distal inner end. Annular base 108 extends radially inward from the distal inner end of the cylindrical portion, to define central opening 110. Since O-ring seals 222 and 224 provide a seal between the valve sleeve and the lower end cap, the flexible lip 112 (FIG. 6) as described above is not necessary, although the lip 112 can be used alternatively to O-ring seals 222, 224, if necessary or desirable.

The key device 210 is also preferably formed unitarily from an appropriate material, such as an inexpensive plastic. Keys 216 are relatively simple to manufacture integral with the valve actuating portion, such as by using common molding techniques.

When the filter element with key device 210 is inserted into the housing 22, at least a portion of the keys can fit through the slots 78 in the valve device, in the same manner as described above with respect to keys 116. The axially longer and radially thinner portions 219 of the keys 216 fit through the slots in the latch device and engage the annular engagement surface 86 of the sleeve on the underlying valve device. As the element is inserted into the housing, the keys press down against the sleeve 84, and cause the latch device to bend outwardly and pull the fingers 80 radially outward from the standpipe. As the fingers are pulled outward, the distal ends 82 of the fingers are pulled outward from groove 62, thus releasing the latch device and allowing the latch device to slide axially downward along the standpipe.

Simultaneously with the fingers being released by the engagement of the keys against the sleeve, the radially wider and axially shorter portions 218 of the keys engage the upper surface of the annular base 72 of the valve device and push the valve device axially downward along the standpipe, in the same manner as described above with respect to FIG. 6.

Figure 20:
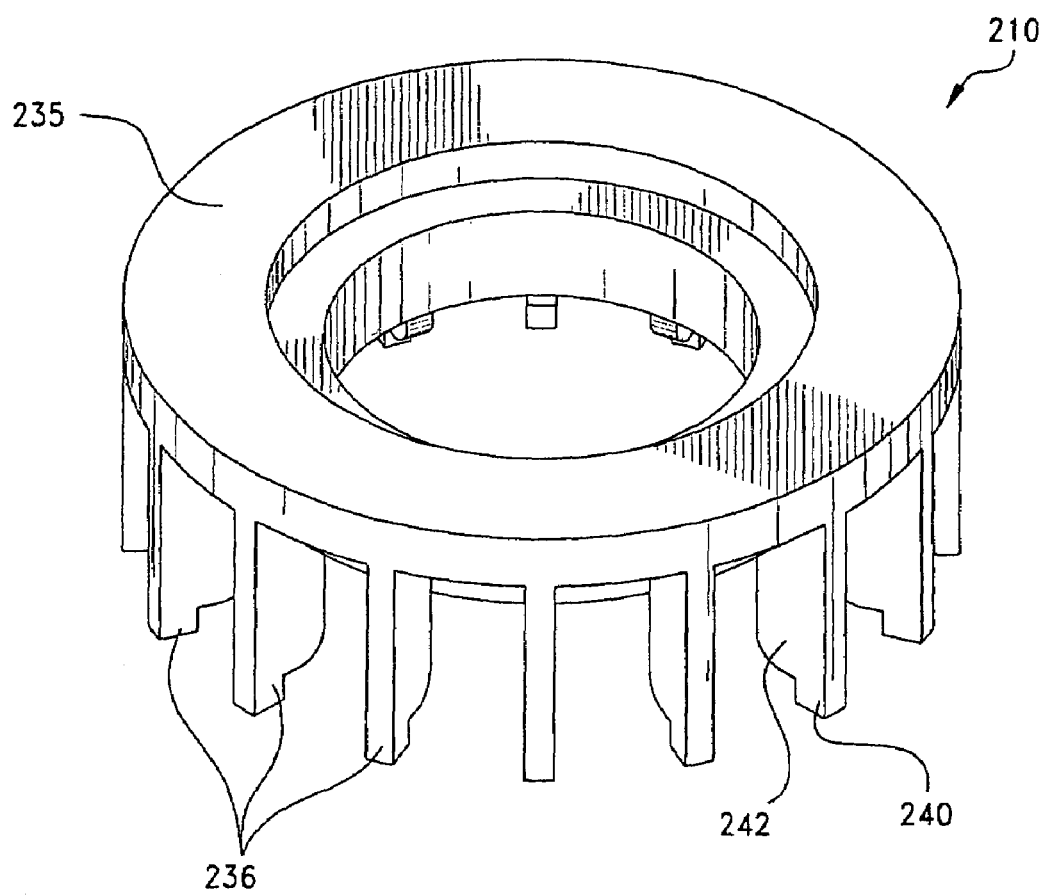
FIG. 20 is an elevated perspective view of the key device for the filter element of FIG. 19.
Figure 19:
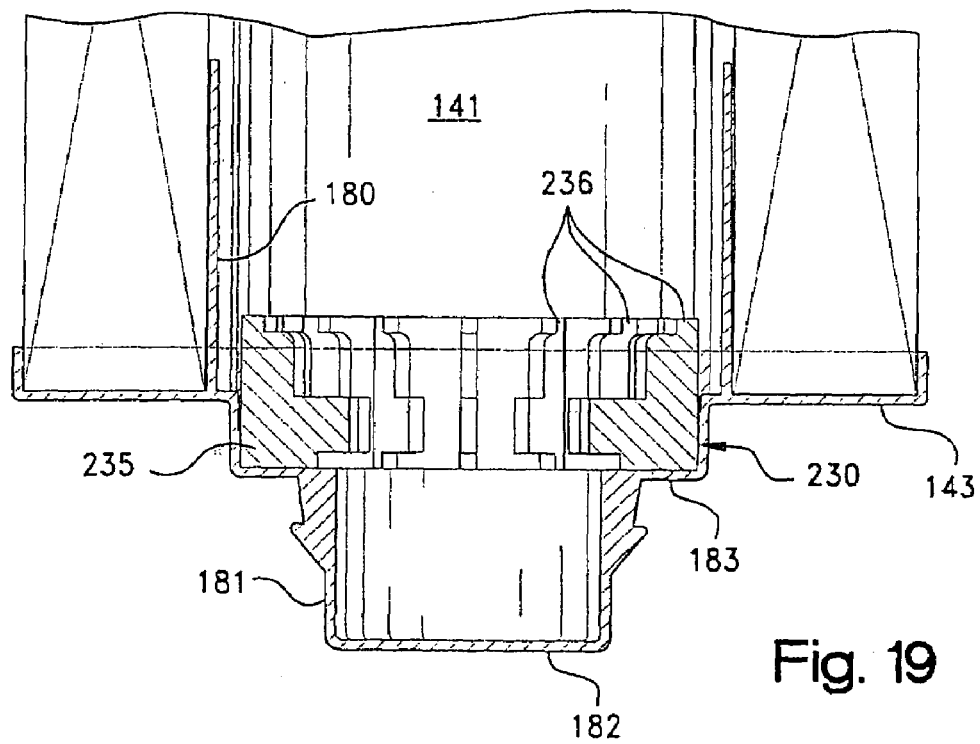
FIG. 19 is a cross-sectional side view of a portion of the filter element similar to FIG. 16, but showing a separate key device.

The keyed portion of the lower end cap 143 of the filter element of FIG. 16 can similarly be provided as a separate device, as illustrated generally at 230 in FIGS. 19 and 20. The key device 230 has a similar, one-piece structure as the key device 210 of FIG. 18, with an annular base 235 dimensioned to fit within the cylindrical portion 180 of the lower end cap and against base 183, and a plurality of thin, flat keys as at 236 projecting axially away from the annular base 235 and radially inward toward the central axis of the filter element. The keys 236 can have axially longer and radially thinner portions as at 240, and axially shorter and radially wider portions as at 242. The only significant difference between key device 230 of FIG. 19 and key device 210 of FIG. 18 is that key device 230 does not need additional O-0-ring seals to separate the dirty side of the element from the clean side, as the lower end cap is closed by cylindrical portion 181 and end wall 182.

The remainder of the lower end cap 143 is preferably the same as described above with respect to FIG. 16.

As described above with respect to FIG. 16, the keys 194 of the key device, and the tabs 76 and slots 78 on the latch device 64 are arranged such that when the filter element is inserted into the housing, at least a portion of the keys can fit through the slots 78. The axially longer and radially thinner portions 240 of the keys fits through the slots 78 in the latch device and engage the engagement surface 86 of the sleeve 84 on the valve device. Similar to the second embodiment, as the element is inserted upwardly into the housing, the keys press against the sleeve 84, and cause the latch device to bend and pull the fingers 80 radially outward from the inlet pipe. As the fingers are pulled outward, the distal ends 82 of the fingers are pulled outward from locking groove 167, thus releasing the latch device and allowing the latch device to slide axially upward along the inlet pipe.

Simultaneously with the fingers 80 being released, the radially wider and axially shorter portions 242 of the keys engage the lower surface of the base 72 of the valve device to also push the valve device axially upward along the inlet pipe, thus uncovering the opening 160.

As described above, the dimensions, number and location of the tabs and slots in the latch device, and the dimensions, number and location of the keys 236 on the key device, determine the correct fit of the filter element in the housing. The dimensions, number and location of the keys, tabs and slots, can be chosen such that particular filter elements are only insertable in certain housings.

Thus, as described above, the fuel filter of the present invention thereby prevents an improper filter element from being used in the filter housing, and prevents operation of the filter without a filter element. The valve structure is external to the central pipe, which is relatively cost-effective to manufacture and assemble. In addition, the opening to the fuel passage in the pipe is located toward the bottom end of the housing, typically below the level of fuel, to prevent air from entering the system.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A filter element having a ring of filter media defining a central cavity and circumscribing a central axis, said ring of filter media having a first end and a second end; first and second end caps fixed to said first and second ends, respectively, of said filter media, the second end cap having an annular end cap portion sealingly bonded to the second end of said filter media and defining a first central opening, and wherein the second end cap further has a valve-actuating portion, including a cylindrical portion internal to the media ring and connected at one axially outer end to the annular end cap portion and an annular base connected to another axially inner end of the cylindrical portion and extending radially inward from said cylindrical portion to define a second central opening which can receive a pipe, the second central opening being co-axial with and radially smaller than the first central opening, a sealing device bounding the second central opening; and a plurality of keys, each key having i) an axially inner end edge fixed to and supported by the second end cap, ii) a distal, axially outer free end edge, and iii) a radially inner side edge freely supported and spaced radially outward from the second central opening and radially inward from the first central opening.

2. The filter element as in claim 1, wherein said annular end cap portion, cylindrical portion, base and said keys are unitary, in one piece.

3. The filter element as in claim 1, wherein the keys are located in surrounding relation to the second central opening.

4. The filter element as in claim 1, wherein the keys are each thin and flat.

5. The filter element as in claim 1, wherein the keys are located internal to the cylindrical portion.

6. The filter element as in claim 1, wherein the cylindrical portion circumscribes the inner diameter of said annular end cap portion.

7. A filter element having a ring of filter media defining a central cavity and circumscribing a central axis, said ring of filter media having a first end and a second end; first and second annular end caps sealingly bonded to said first and second ends, respectively, of said filter media, with the second end cap defining a first central opening, the second end cap further having a valve-actuating portion, including an axially-extending cylindrical portion connected to and extending axially from the second end cap into the central cavity, and an annular base connected to the cylindrical portion and extending radially inward from said cylindrical portion to define a second central opening which can receive a pipe, wherein the second central opening is co-axial with and radially smaller than the first central opening, a sealing device bounding the second central opening, and a plurality of keys, each key having an axially inner end edge fixed to and supported by the second end cap, an opposite axially outer end edge freely supported, and a radially inner side edge freely supported and spaced radially outward from the second central opening and radially inward from the first central opening.

8. The filter element as in claim 7, wherein the cylindrical portion is connected to and extends inwardly into the element from the inner diameter of the annular second end cap.

9. The filter element as in claim 7, wherein the keys are located internal to the cylindrical portion.

10. The filter element as in claim 7, wherein said annular end cap portion, cylindrical portion, base and said keys are unitary, in one piece.

11. The filter element as in claim 7, wherein the keys are each thin and flat.

12. The filter element as in claim 7, wherein the cylindrical portion circumscribes the inner diameter of said second annular end cap.

13. A filter element having a ring of filter media defining a central cavity and circumscribing a central axis, said ring of filter media having a first end and a second end; first and second end cap assemblies fixed to said first and second ends, respectively, of said filter media, the second end cap assembly including: i) an annular end cap portion defining a first central opening and having an axially inner surface sealingly bonded to the second end of said filter media; ii)

a cylindrical portion projecting axially from the inner surface into the central cavity of the element; iii) an annular base connected to the cylindrical portion and extending radially inward from the cylindrical portion to define a second central opening which can receive a pipe, the second central opening being co-axial with and smaller than the first central opening; iv) a sealing device bounding the second central opening; and v) a plurality of thin, flat keys supported by the second end cap assembly, each key having an axially inner end edge fixed to and supported by the second end cap assembly, an opposite axially outer end edge freely supported, and a radially inner side edge freely supported and bounding an imaginary cylinder circumscribing the central axis and located radially between the first central opening and the second central opening.

* * * * *